Dec. 10, 1929.  E. S. EVANS ET AL  1,739,354
WHEEL HOLDDOWN
Filed July 13, 1927
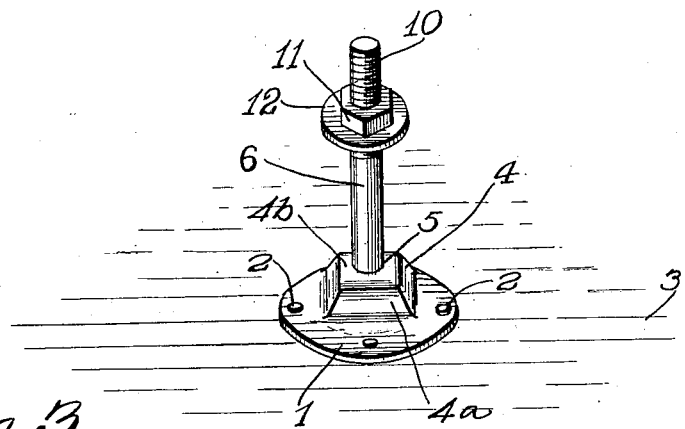
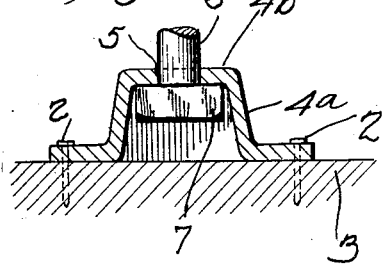
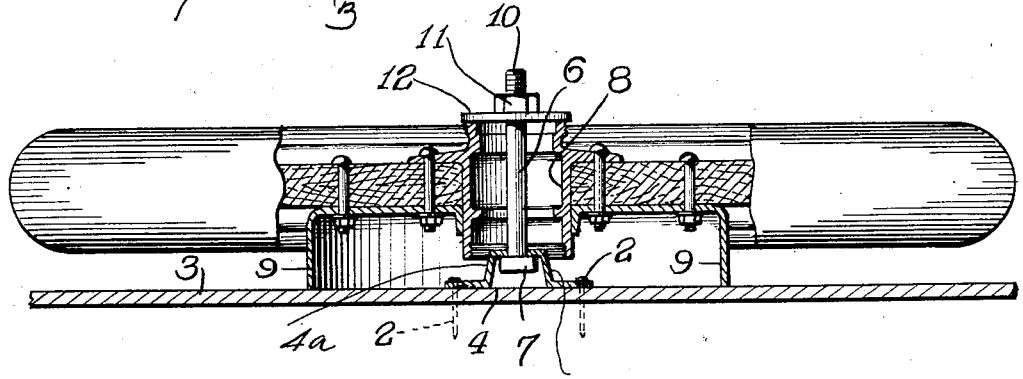
E. S. Evans
C. L. Snyder
INVENTORS.
BY
ATTORNEY.

Patented Dec. 10, 1929

1,739,354

UNITED STATES PATENT OFFICE

EDWARD S. EVANS AND CLIFFORD L. SNYDER, OF DETROIT, MICHIGAN, ASSIGNORS TO THE EVANS AUTO LOADING CO. INC., OF DETROIT, MICHIGAN, A CORPORATION OF DELAWARE

WHEEL HOLD DOWN

Application filed July 13, 1927. Serial No. 205,366.

This invention relates to certain new and useful improvements in wheel holddowns and has special reference to the shipment of automobiles where the wheels are separated from the automobile and are anchored to the car floor.

In certain methods employed in the shipment of automobiles, it is desirable to remove the wheels from the automobile axles, and in such instances, it has been found preferable to anchor the wheels to the car floor and in the anchoring of the wheels that have the brake drum fixed thereto, the drum is disposed at the lower side of the wheel in engagement with the car floor with the wheel tire spaced from the floor, the anchoring device passing through the hollow hub of the wheel with a wheel retaining element upon its upper end for holding the edge of the brake drum in binding engagement with the car floor and the entire wheel rigidly supported.

A further object of the invention is to provide an anchoring device or holddown for automobile wheels wherein an anchoring foot has a central raised portion fashioned for intimate engagement with the head of the bolt associated therewith to prevent rotary movement of the bolt during assembly of a retaining nut thereon.

With the above and other objects in view that will become apparent as the nature of the invention is better understood, the same consists in the novel form, combination and arrangement of parts hereinafter more fully described, shown in the accompanying drawing and claimed.

In the drawing wherein like reference characters indicate corresponding parts throughout the several views, Figure 1 is a view of a wheel anchoring device constructed in accordance with the present invention;

Figure 2 is an edge elevational view of an automobile wheel, partly broken away and shown in section and illustrated as anchored to a car floor by the anchoring device; and Figure 3 is a vertical cross-sectional view of the holddown foot and showing the wheel hub bolt therein.

The device disclosed herein for anchoring an automobile wheel to a car floor during shipment thereof is cooperatively engaged with the hub portion of the wheel to cause binding action between the outer edge of the brake drum and the car floor with the wheel tire supported in a position elevated from the floor to eliminate any possibility of rubbing contact between the tire and car floor. The anchoring device comprises a floor plate or foot having an outer ring portion 1 to be secured by the fastening devices 2 to the floor 3, the central portion of the floor foot being arched upwardly as at 4 with a central opening 5 therein. A bolt 6 is slidable through the opening 5 in an upward direction and is limited in such movement by the head 7 on the lower end of the bolt. The upwardly arched portion 4 is of polygonal formation in plan view having flattened sides 4ª and a flat upper surface 4ᵇ. The bolt head 7 is of similar form so that rotation of the bolt is prevented when the head 7 is received in the upwardly arched portion 4 as shown.

The type of automobile wheel herein illustrated to be arched to the floor 3 comprises the usual hollow hub 8 and brake drum 9. The foot plate and bolt 6 are first assembled and then secured to the car floor 3 as shown in Figure 2, the wheel being then positioned as illustrated with the bolt 6 projecting upwardly through the hollow hub 8 of the wheel. When so disposed, the outer edge of the brake drum 9 rests upon the car floor 3 with the tire of the wheel spaced upwardly from the floor.

The upper end of the bolt 6 is threaded as at 10 to receive the binding nut 11, a washer 12 being interposed between the nut 11 and the upper side of the hollow hub 8. Upon tightening the nut 11, the washer 12 is moved into binding engagement with the upper edge of the hub 8 while upward movement of the bolt 6 is limited by the head 7 upon the lower end thereof that engages the arched portion 4 of the floor foot. During the tightening of the bolt 6, rotation thereof is prevented and the brake drum 9 is moved into binding engagement with the car floor 3 whereby a very secure and rigid anchoring of the wheel is accomplished. While the form of wheel herein disclosed is of the spoke type with a brake drum carried thereby, it is to be understood that the holddown may be employed for anchoring wheels of other types such as a disk wheel or a wheel without a brake drum.

While there is herein shown and described the preferred embodiment of the present invention, it is nevertheless to be understood that minor changes may be made therein without departing from the spirit and scope of the invention as claimed.

What we claim as new is:—

A holddown for automobile wheels comprising an anchoring foot having a floor flange adapted to be secured to the floor of a car, and formed with an upwardly rising central boss, pierced for the passage of a wheel retaining bolt, and a bolt having a head on its lower end and threaded at its upper end for the reception of a nut, said central boss being of polygonal formation on its inner portion and said bolt head being shaped to interlock with the boss to prevent turning, and said bolt having a washer at its upper end to rest on the hub of a wheel and constitute a seat for the nut, the device being constructed and adapted to secure a wheel to a car floor, with the brake drum resting thereon.

In testimony whereof we affix our signatures.

EDWARD S. EVANS.
CLIFFORD L. SNYDER.